US010074226B2

(12) United States Patent
Meganathan

(10) Patent No.: US 10,074,226 B2
(45) Date of Patent: Sep. 11, 2018

(54) SYSTEMS AND METHODS FOR PROVIDING UAV-BASED DIGITAL ESCORT DRONES IN VISITOR MANAGEMENT AND INTEGRATED ACCESS CONTROL SYSTEMS

(71) Applicant: Honeywell International Inc., Morristown, NJ (US)

(72) Inventor: Deepak Sundar Meganathan, Bangalore (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 15/467,224

(22) Filed: Mar. 23, 2017

(65) Prior Publication Data

US 2017/0287242 A1 Oct. 5, 2017

Related U.S. Application Data

(60) Provisional application No. 62/318,578, filed on Apr. 5, 2016.

(51) Int. Cl.
*G07C 9/00* (2006.01)
*B64C 39/02* (2006.01)
(Continued)

(52) U.S. Cl.
CPC ........ *G07C 9/00103* (2013.01); *B64C 39/024* (2013.01); *G01C 21/20* (2013.01);
(Continued)

(58) Field of Classification Search
CPC .... G05D 1/101; G05D 1/0011; G05D 1/0088; G08B 13/19604; G08B 13/1965;
(Continued)

(56) References Cited

U.S. PATENT DOCUMENTS 6,965,816 B2 * 11/2005 Walker .................... B64C 13/20
244/189
8,751,061 B2 * 6/2014 Coulmeau ............ G08G 5/0069
701/2
(Continued)

FOREIGN PATENT DOCUMENTS

WO WO 2014/080387 A2 5/2014
WO WO 2016/065623 A1 5/2016

OTHER PUBLICATIONS

Extended European search report from corresponding EP patent application 17164633.4, dated May 4, 2017.
(Continued)

*Primary Examiner* — Brian Miller
(74) *Attorney, Agent, or Firm* — Husch Blackwell LLP

(57) ABSTRACT

Systems and methods for providing UAV-based digital escort drones in visitor management and access control systems are provided. A visitor management and access control system can identify a need for escorting a visitor through a region and transmit a signal to a drone that identifies a starting location and a destination location in the region. Responsive to receiving the signal, the drone can escort the visitor along a path from the starting location to the destination location, and an access privilege device carried by the drone can open a secured door or access a secured area along the path.

18 Claims, 3 Drawing Sheets

(51) Int. Cl.
*G01C 21/20* (2006.01)
*G01S 19/13* (2010.01)
*G08G 5/00* (2006.01)
*H04B 1/3822* (2015.01)
*G06Q 50/00* (2012.01)

(52) U.S. Cl.
CPC .............. *G01S 19/13* (2013.01); *G06Q 50/00* (2013.01); *G08G 5/0069* (2013.01); *H04B 1/3822* (2013.01); *B64C 2201/024* (2013.01); *B64C 2201/108* (2013.01); *B64C 2201/12* (2013.01)

(58) Field of Classification Search
CPC ............ B64C 39/024; B64C 2201/127; B64C 2201/146; G08G 5/003
See application file for complete search history.

(56) References Cited

U.S. PATENT DOCUMENTS

| | | | |
|---|---|---|---|
| 9,170,117 | B1 | 10/2015 | Abuelsaad et al. |
| 9,193,458 | B2* | 11/2015 | Pongratz ................. B64C 37/02 |
| 9,254,363 | B2 | 2/2016 | Levien et al. |
| 9,426,674 | B2* | 8/2016 | Pulleti .................. G05D 1/0219 |
| 9,429,945 | B2* | 8/2016 | Pulleti ..................... G01S 13/56 |
| 9,534,906 | B2* | 1/2017 | High ........................ B66F 9/063 |
| 9,764,703 | B2* | 9/2017 | Hoareau ................ B60R 16/04 |
| 9,819,911 | B2* | 11/2017 | K V ........................ H04N 7/185 |
| 2012/0049009 | A1* | 3/2012 | Kissel, Jr. ............. B64C 39/001 244/23 C |
| 2013/0289858 | A1* | 10/2013 | Mangiat ............... G05D 1/0027 701/117 |
| 2015/0248640 | A1 | 9/2015 | Srinivasan |
| 2015/0339912 | A1 | 11/2015 | Farrand et al. |
| 2016/0033966 | A1 | 2/2016 | Farris et al. |
| 2016/0063642 | A1* | 3/2016 | Luciani .................. G06Q 40/08 705/4 |
| 2016/0116914 | A1 | 4/2016 | Mucci |
| 2017/0061290 | A1* | 3/2017 | Harlow .................. G06N 5/022 |
| 2017/0313332 | A1* | 11/2017 | Paget ...................... H04L 67/12 |

OTHER PUBLICATIONS

Brian Handwerk, National Geographic, 5 Surprising Drone Uses (Besides Amazon Delivery), Dec. 2, 2013 http://news.nationalgeographic.com/news/2013/12/131202-drone-uav-uas-amazon-octocopter-bezos-science-aircraft-unmanned-robot.html.
Joseph Dussault, Boston.com, 7 commercial uses for drones, Mar. 14, 2014 http://archive.boston.com/business/2014/03/14/commercial-uses-for-drones/dscS47PsQdP . . . .
Elizabeth Weise, Stuff.co.nz, Nasa foresees drones as future personal assistants, Aug. 3, 2015 http://www.stuff.co.nz/technology/gadgets/70723025/Nasa-foresees-drones-as-future-pers . . . .
Tom Spring (ITWorld), In Pictures: 15 current and future uses for drones, Mar. 21, 2017 http://www.computerworld.co.nz/slideshow/521205/pictures-15-current-future-uses-drone . . . .
Quartz, This is how your personal drone will follow you around in the future, Mar. 21, 2017 https://www.qz.com/52186/3d-robotics-personal-drone-will-follow-you-around-in-the-future/.
PCW World News, Secom security drone follows, photographs intruders, May 22, 2015 http://www.pcworld.com/article/2925912/secom-security-drone-follows-photographs-intru . . . .

* cited by examiner

SYSTEMS AND METHODS FOR PROVIDING UAV-BASED DIGITAL ESCORT DRONES IN VISITOR MANAGEMENT AND INTEGRATED ACCESS CONTROL SYSTEMS

CROSS-REFERENCE TO RELATED APPLICATIONS

This application claims priority to U.S. Provisional Patent Application No. 62/318,578 filed Apr. 5, 2016 and titled "Systems and Methods for Providing UAV-Based Digital Escort Drones in Visitor Management and Integrated Access Control Systems." U.S. Application No. 62/318,578 is hereby incorporated by reference.

FIELD

The present invention relates generally to visitor management and integrated access control systems. More particularly, the present invention relates to systems and methods for providing UAV-based digital escort drones in visitor management and integrated access control systems.

BACKGROUND

Drones or other unmanned aerial vehicles (UAVs) are known in the art and are increasingly used for different applications, both commercial and non-commercial, despite the increase in the regulation of drones. For example, FIG. 1 is an isometric view of a drone 100 known in the art that can be used for recreation, surveillance, photography, delivery, internet services, news, agriculture, public service, and the like.

Visitor management and integrated access control systems are also known in the art and are often used in large regions, such as campuses, multi-storied buildings, corporate buildings, colleges, hospitals, airports, and the like, where there are a large number of visitors. In known systems, a visitor is provided with a visitor access card that is programmed based on the visitor's destination location within a region. Alternatively, a human guard escorts the visitor throughout the region and to the visitor's destination location in the region.

However, it is often difficult for known systems to identify a current location of the visitor and the visitor's destination location. Furthermore, the visitor may take more time than is necessary to reach his destination location due to misunderstanding a complex building's structure. Moreover, while the manual assistance of the human guard may be necessary due to a high profile nature of the visitor or due to restricted or high security zones that must be traversed by the visitor, providing such manual assistance is undesirable, especially when multiple human guards are necessary to escort visitors.

In view of the above, there is a continuing, ongoing need for improved systems and methods.

DETAILED DESCRIPTION

Figure 1:
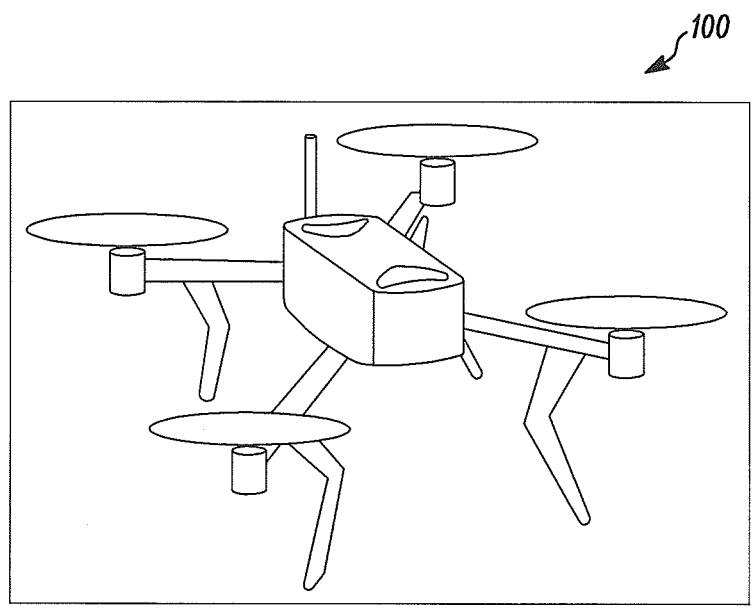
FIG. 1 is an isometric view of a drone known in the art.

While this invention is susceptible of an embodiment in many different forms, specific embodiments thereof will be described herein in detail with the understanding that the present disclosure is to be considered as an exemplification of the principles of the invention. It is not intended to limit the invention to the specific illustrated embodiments.

Embodiments disclosed herein can include systems and methods for providing UAV-based digital escort drones in visitor management and integrated access control systems. For example, one or more drones can be mobile and programmed to act as a digital guard or escort within a controlled premises, property, facility, or region for escorting or guiding a visitor from a starting location to a destination location in the region.

In some embodiments, a drone as disclosed herein can include one or more access cards or tags with access privileges that can be used to traverse the region by opening secured doors or accessing secured areas. In some embodiments, an access card or tag associated with the drone can have long range RF capability that can be used to access and open boom barriers, access doors, or the secured areas in the region.

In some embodiments, the drone as disclosed herein can identify its own current location based on signals received from location sensors and systems installed within the region, such as security sensors, the access doors, and card readers. Additionally or alternatively, in some embodiments, the drone as disclosed herein can include a simultaneous localization and mapping (SLAM) device to identify its own current location, for example, when the region does not include the location sensors. Additionally or alternatively, in some embodiments, the drone as disclosed herein can include a GPS device to identify its own current location, for example, when then the drone is outdoors. In any embodiment, as the current location changes, the drone can confirm that it is moving on a correct path, in a correct direction, and in an expected time period to move from the starting location to the destination location.

In some embodiments, the drone as disclosed herein can identify and fly at an optimal height to ensure that the drone does not hit or otherwise interfere with obstacles, moving objects, and people within the region.

In some embodiments, the drone as disclosed herein can be located in a predetermined charging station or at a central station of a visitor management and access control system prior to being dispatched to act as the digital guard or escort. The visitor management and access control system can identify a need for escorting the visitor, a vendor, or a vehicle in the region in which the visitor management and access control system is installed and, responsive thereto, wirelessly transmit a signal to the drone identifying relevant details of the visitor, the vendor, or the vehicle, the starting location and the destination location therefor, location details of the region, and restricted or controlled access between the starting location and the destination location.

Receiving the signal from the visitor management and access control system can dynamically program the drone as disclosed herein to travel from the starting location identified in the signal to the destination location identified in the signal. For example, the drone can be preprogrammed with the location details of the region in which the visitor management and access control system is installed, including X, Y, and Z (height) coordinates for the region, and the signal from the visitor management and access control system can instruct the drone how to travel from the starting location to the destination location using the X, Y, and Z coordinates of the region.

After the drone as disclosed herein is dynamically programmed, the drone can move to the starting location and begin traversing the region to reach the destination location. Because the drone can act as the digital guide or escort while traversing the region, the drone can transmit audio and/or visual signals addressed to the visitor, such as signals to welcome the visitor or signals to instruct the visitor when and where to turn, pause, or open a door. In some embodiments, the drone can identify the visitor's name from the signal received from the visitor management and access control system and, thus, can use the visitor's name in the audio and/or visual signals transmitted.

In some embodiments, the drone as disclosed herein can receive audio communication from the visitor, such as questions from the visitor and, to answer the audio communication from the visitor, transmit the audio and/or visual signals to the visitor responsive thereto. For example, the drone can relay the audio communication received from the visitor to an operator of the visitor management and access control system or a host in the region that the visitor intends to see and receive a response signal from the operator of the visitor management and access control system or the host, which the drone can communicate to the visitor via the audio and/or visual signals.

In some embodiments, the drone as disclosed herein can include one or more cameras or other image capturing devices that can capture images of an ambient environment and transmit signals indicative of the ambient environment to the central station of the visitor management and access control system and the operator monitoring the same. Accordingly, the operator can remotely monitor the drone escorting the visitor, or details thereof can be saved for later review.

In some embodiments, the drone as disclosed herein can include a user interface device for displaying information to a the visitor, including the location details received or identified by the drone.

In some embodiments, the visitor can register his visit to the region and details thereof online via a website prior to the visitor's arrival in the region or via a kiosk in the region when the visitor arrives in the region. Systems and methods disclosed herein can use such registration information provided by the visitor to identify the need for escorting the visitor and, responsive thereto and at a predetermined time, assign or schedule the drone to escort the visitor by wirelessly transmitting the signal to the drone as disclosed herein identifying the relevant details of the visitor, the starting location and the destination location therefor, the location details of the region, and the restricted or controlled access between the starting location and the destination location.

Advantages of systems and methods disclosed herein can include, but are not limited to reducing or eliminating a need for a human guard escort, automating an escorting system, and recording and reviewing activities of a digital escort drone.

Figure 2:
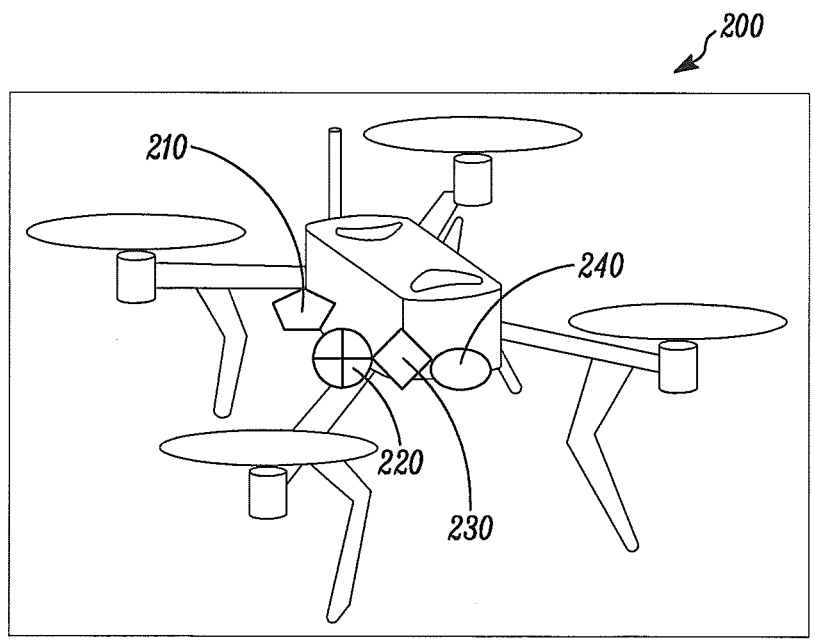
FIG. 2 is an isometric view of a UAV-based digital escort drone in accordance with disclosed embodiments.

FIG. 2 is an isometric view of a UAV-based digital escort drone 200 in accordance with disclosed embodiments. As seen in FIG. 2, the drone 200 can include one or more access privilege device 210, such as an access card or tag, associated with the drone 200 or carried thereon such that the access privilege device 210 can include access privileges to open secured doors or access secured areas. Additionally or alternatively, the drone 200 can include one or more two-way audio device 220, such as a device with a microphone and a speaker, associated with the drone 200 or carried thereon such that the two-way audio device 220 can receive audio communication from a visitor and transmit audio to the visitor. Additionally or alternatively, the drone 200 can include one or more user interface device 230 associated with the drone 200 or carried thereon for displaying visual information to the visitor. Additionally or alternatively, the drone 200 can include one or more location sensing device 240, such as a receiver for receiving signals from location sensors, a SLAM device, or a GPS device, associated with the drone 200 or carried thereon for receiving the signals from the location sensors, such as security sensors, access doors, and card readers.

Although not shown in FIG. 2, it is to be understood that the drone 200 can also include a transceiver device and a memory device in communication with control circuitry, one or more programmable processors, and executable control software as would be understood by one of ordinary skill in the art to implement systems and methods described above and herein. It is also to be understood that one or more of the access privilege device 210, the two-way audio device 220, the user interface device 230, and the location sensing device 240 can be in communication with the control circuitry, the programmable processors, and the executable control software. In some embodiments, the executable control software can be stored on a transitory or non-transitory computer readable medium, including, but not limited to local computer memory, RAM, optical storage media, magnetic storage media, flash memory, and the like, and some or all of the control circuitry, the programmable processors, and the executable control software can execute and control at least some of the methods described above.

Figure 3:
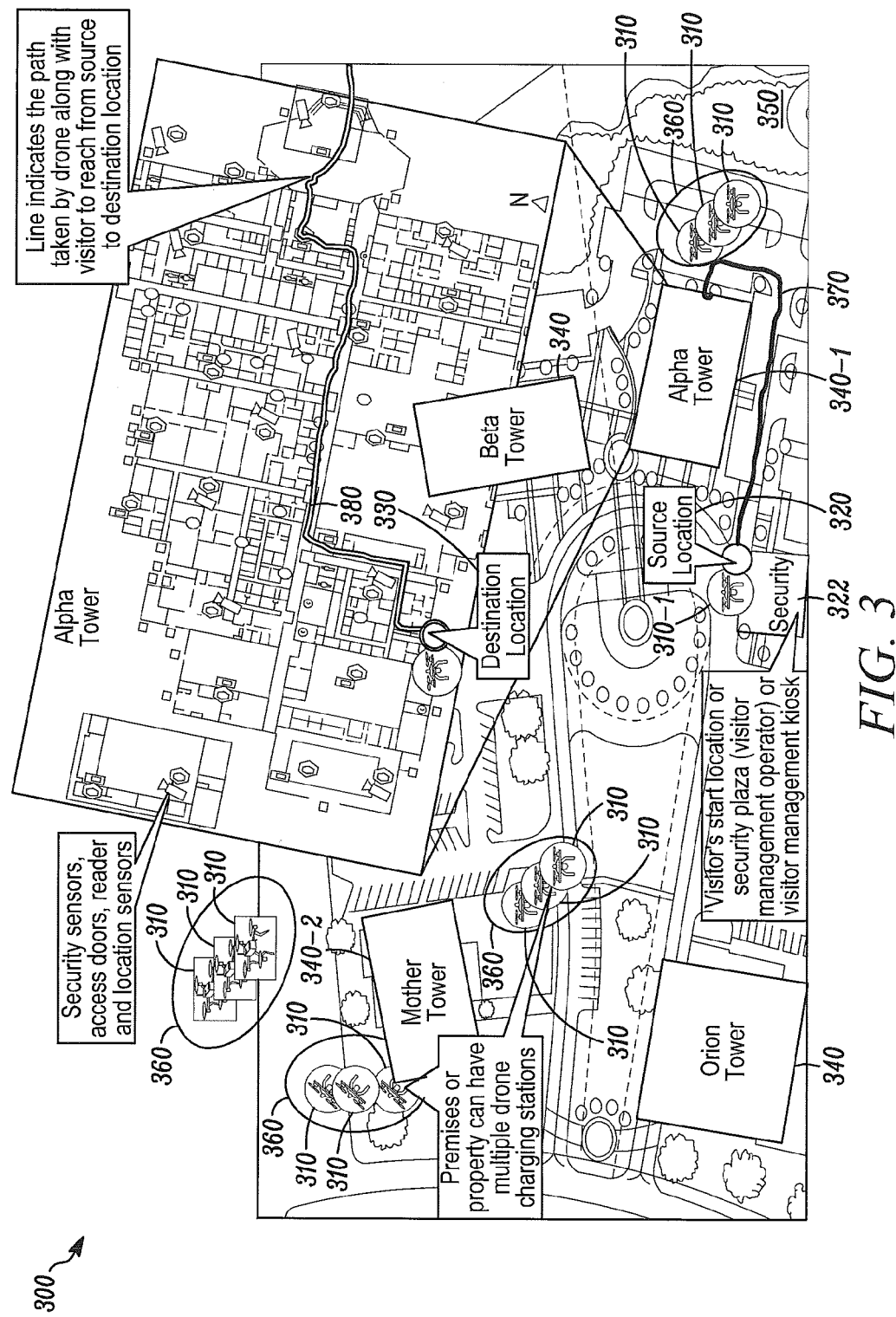
FIG. 3 is a map of a UAV-based digital escort drone escorting a visitor from a starting location to a destination location in a building in a region.

FIG. 3 is a map 300 of a UAV-based digital escort drone 310-1 escorting a visitor from a starting location 320 to a destination location 330 in a building 340-1 in a region 350. For example, as seen in FIG. 3, the region 350 can include a plurality of charging stations 360 for drones 310, 310-1 as disclosed herein, the starting location 320 for the visitor at a security plaza 322 with a central station of a visitor management and access control system, and a plurality of buildings 340, 340-1, 340-2. Responsive to the visitor checking in with the central station of the visitor management and access control system at the security plaza 322, systems and methods disclosed herein can transmit a signal to a transceiver device of the drone 310-1 at one of the plurality of charging stations 360 to dynamically program the drone 310-1 to escort the visitor from the starting location 320 to the destination location 330 by following a path 370 from the starting location 320 to the building 340-1 and, once inside of the building 340-1, by following a path 380 past and through security sensors, access doors, and reader and location sensors to the destination location 330. That is, in some embodiments, systems and methods disclosed herein can transmit the signal to the drone 310-1 such that the signal identifies at least the starting location 320 and the destination location 330, and in some embodiments, the signal transmitted to the drone 310-1 can identify location details for the region 350 and the building 340-1, including any restricted or controlled access between the starting location 320 and the destination location 330.

Figure 4:
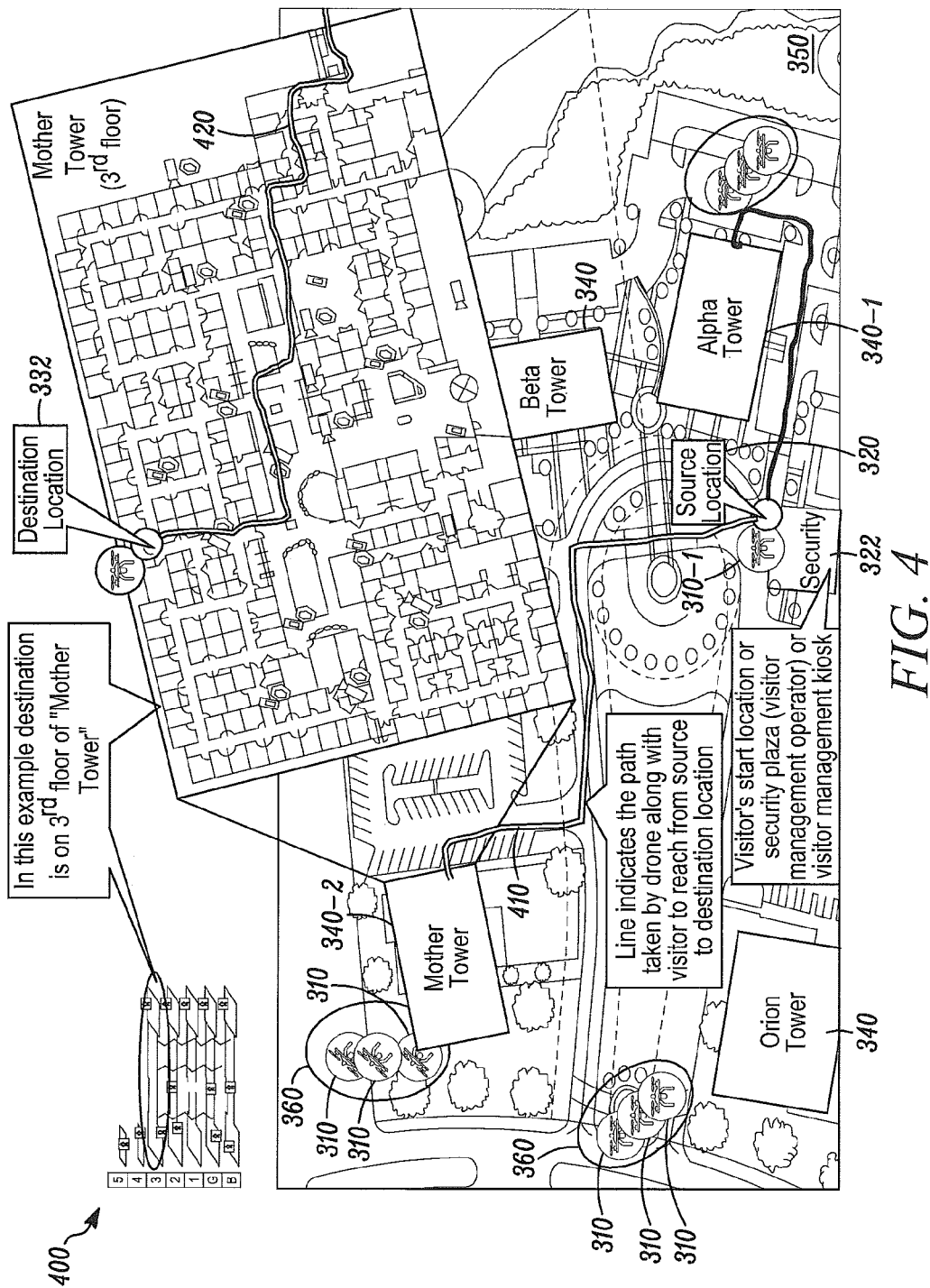
FIG. 4 is a map of a UAV-based digital escort drone escorting a visitor from a starting location to a destination location in a building in a region.

FIG. 4 is a map 400 of the UAV-based digital escort drone 310-1 escorting the visitor from the starting location 320 to a destination location 332 in the building 340-2 in the region 350. For example, as seen in FIG. 4, responsive to the visitor checking in with the central station of the visitor management and access control system at the security plaza 322, systems and methods disclosed herein can transmit the signal to the transceiver device of the drone 310-1 at the one of the plurality of charging stations 360 to dynamically program the drone 310-1 to escort the visitor from the starting location 320 to the destination location 332 by following a path 410 from the starting location 320 to the building 340-2 and, once inside of the building 340-2, by following a path 420 past and through the security sensors, the access doors, and the reader and location sensors to the third floor of the building 340-2 and to the destination location 332 on the third floor. That is, in some embodiments, systems and methods disclosed herein can transmit the signal to the drone 310-1 such that the signal identifies at least the starting location 320, the destination location 332, and floor details of the destination location 332 or the building 340-2 in which the destination location 332 is located, and in some embodiments, the signal transmitted to the drone 310-1 can identify the location details for the region 350 and the building 340-2, including any restricted or controlled access between the starting location 320 and the destination location 332.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A system comprising:
  a drone;
  a transceiver device carried by the drone;
  an access privilege device carried by the drone;
  a programmable processor carried by the drone; and
  executable control software stored on a non-transitory computer readable medium carried by the drone,
  wherein the transceiver device receives a first signal indicating a need for escorting a visitor and identifying a starting location, a destination location, a path through a region between the starting location and the destination location, and access point locations of controlled access points along the path,
  wherein, responsive to the transceiver device receiving the first signal, the programmable processor and the executable control software instruct the drone to rendezvous with the visitor at the starting location and to guide the visitor to the destination location by traversing the path from the starting location to the destination location, and
  wherein the access privilege device opens the controlled access points at the access point locations along the path.

2. The system as in claim 1 further comprising:
  a location sensing device,
  wherein the location sensing device receives a plurality of second signals from location sensors along the path, and
  wherein the programmable processor and the executable control software identify a current location of the drone based on the plurality of second signals.

3. The system of claim 2 wherein the programmable processor and the executable control software confirm that the drone is following the path as the current location changes.

4. The system of claim 1 further comprising:
  a SLAM device or a GPS device,
  wherein the SLAM device or the GPS device receives a plurality of second signals, and
  wherein the programmable processor and the executable control software identify a current location of the drone based on the plurality of second signals.

5. The system of claim 1 wherein the programmable processor and the executable control software identify an optimal height for flying the drone along the path.

6. The system of claim 1 further comprising a memory device carried by the drone that stores location details for the region and the access point locations.

7. The system of claim 1 further comprising:
  a two-way audio device carried by the drone,
  wherein the programmable processor and the executable control software instruct the two-way audio device to emit audio signals addressed to the visitor,
  wherein the two-way audio device receives audio communication from the visitor, and
  wherein programmable processor and the executable control software transmit the audio communication to an operator of a visitor management and access control system of the region or to an intended host of the visitor in the region.

8. The system of claim 1 further comprising:
  a user interface device carried by the drone,
  wherein the programmable processor and the executable control software instruct the user interface device to display visual information to the visitor.

9. A method comprising:
  a transceiver device carried by a drone receiving a first signal indicating a need for escorting a visitor and identifying a starting location, a destination location, a path through a region between the starting location and the destination location, and access point locations of controlled access points along the path;
  responsive to the transceiver device receiving the first signal, a programmable processor carried by the drone and executable control software stored on a non-transitory computer readable medium carried by the drone instructing the drone to rendezvous with the visitor at the starting location and to guide the visitor to the destination location by traversing the path from the starting location to the destination location; and
  an access privilege device carried by the drone opening the controlled access points at the access point locations along the path.

10. The method of claim 9 further comprising:
  a location sensing device carried by the drone receiving a plurality of second signals from location sensors along the path; and
  the programmable processor and the executable control software identifying a current location of the drone based on the plurality of second signals.

11. The method of claim 10 further comprising the programmable processor and the executable control software confirming that the drone is following the path as the current location changes.

12. The method of claim 9 further comprising:
  a SLAM device carried by the drone or a GPS device carried by the drone receiving a plurality of second signals; and the programmable processor and the executable control software identifying a current location of the drone based on the plurality of second signals.

13. The method of claim 9 further comprising the programmable processor and the executable control software identifying an optimal height for flying the drone along the path.

14. The method of claim 9 further comprising a memory device carried by the drone storing location details for the region and the access point locations.

15. The method of claim 9 further comprising:

the programmable processor and the executable control software instructing a two-way audio device carried by the drone to emit audio signals addressed to the visitor;

the two-way audio device receiving audio communication from the visitor; and the programmable processor and the executable control software transmitting the audio communication to an operator of a visitor management and access control system of the region or to an intended host of the visitor in the region.

16. The method of claim 9 further comprising the programmable processor and the executable control software instructing a user interface device carried by the drone to display visual information to the visitor.

17. A system comprising:

a visitor management and access control system installed in a region;

a drone; and an access privilege device carried by the drone, wherein the visitor management and access control system identifies a need for escorting a visitor through the region and transmits a signal to the drone that indicates the need and identifies a starting location, a destination location, a path through the region between the starting location and the destination location, and access point locations of controlled access points along the path, wherein, responsive to receiving the signal, the drone rendezvouses with the visitor at the starting location and escorts the visitor to the destination location by traversing the path from the starting location to the destination location, and wherein the access privilege device opens the controlled access points at the access point locations along the path.

18. The system of claim 17 wherein the visitor management and access control system identifies the need responsive to the visitor providing registration information to the visitor management and access control system, and wherein the visitor management and access control system identifies the starting location and the destination location based on the registration information.

* * * * *